United States Patent [19]
Fram

[11] Patent Number: 6,032,388
[45] Date of Patent: Mar. 7, 2000

[54] THIN, FLEXIBLE SHOE OUTSOLE WITH INJECTED-THROUGH TREAD ELEMENTS, A METHOD OF PRODUCING SUCH AN OUTSOLE AND A SHOE PROVIDED WITH SUCH AN OUTSOLE

[75] Inventor: Craig Fram, Plaistow, N.H.

[73] Assignee: Puma AG Rudolf Dassler Sport, Herzogenaurach, Germany

[21] Appl. No.: 09/070,761

[22] Filed: May 1, 1998

[51] Int. Cl.[7] .............................. A43B 5/06; A43C 15/02; B29C 45/00
[52] U.S. Cl. ............................. 36/129; 36/59 R; 36/59 A; 36/59 B; 264/273
[58] Field of Search .................................. 36/59 R, 59 A, 36/59 B, 59 C, 62, 67 R, 67 A, 67 B, 67 C, 127, 129; 264/273

[56] References Cited

U.S. PATENT DOCUMENTS

| | | |
|---|---|---|
| 715,138 | 12/1902 | Pierce . |
| 1,973,748 | 9/1934 | Caldwell . |
| 2,658,289 | 11/1953 | Schrieber . |
| 2,697,288 | 12/1954 | Wilcox . |
| 3,237,323 | 3/1966 | MacNeill . |
| 3,818,617 | 6/1974 | Dassler et al. . |
| 4,167,071 | 9/1979 | Koransky . |
| 4,180,923 | 1/1980 | Dassler . |
| 4,524,531 | 6/1985 | VanDeripe . |
| 4,702,021 | 10/1987 | Cameron . |
| 5,139,566 | 8/1992 | Zimmerman . |
| 5,265,354 | 11/1993 | Aliano, Jr. . |
| 5,673,472 | 10/1997 | Muller . |

FOREIGN PATENT DOCUMENTS

| | | |
|---|---|---|
| 140302 | 3/1920 | United Kingdom . |

OTHER PUBLICATIONS

BASICS, Spring/Summer 1995 Footwear Catalogue, 3 pages.
BASICS, Spring/Summer 1996 Footwear Catalogue, 3 pages.

*Primary Examiner*—Ted Kavanaugh
*Attorney, Agent, or Firm*—Sixbey, Friedman, Leedom & Ferguson; David S. Safran

[57] ABSTRACT

An outsole for a shoe is formed a thin, flexible, nonporous and inelastic sheet material having a pattern of perforations through it, and a plurality of tread elements of a hard, wear-resistant material molded onto a first side of the sheet material by a process in which the tread forming material is inject through the perforations in a manner such that at least some of the resultant tread elements have anchoring portions extending through the perforations from an opposite second side of the sheet material, a portion of the sheet material around the perforations being held between the tread elements and the anchoring portions. A pattern of treads of various shapes and sizes can be provided in a configuration generally conforming with the sole surface to which the outsole is to be applied, so that a minimum of tread material wastage occurs when the outsole is cut out from the sheet material.

35 Claims, 6 Drawing Sheets

THIN, FLEXIBLE SHOE OUTSOLE WITH INJECTED-THROUGH TREAD ELEMENTS, A METHOD OF PRODUCING SUCH AN OUTSOLE AND A SHOE PROVIDED WITH SUCH AN OUTSOLE

BACKGROUND OF THE INVENTION

1. Field of the Invention

The present invention relates to outsoles for athletic shoes, particularly those for shoes, such as running shoes, in which the sole has a shock absorbing midsole layer on the outside of which a wear resistant outsole with a tread surface is applied. More specifically, the present invention to an outsole of this type which has tread elements affixed to a thin flexible sheet material that is cemented to the underside of the at least portions of the midsole. The invention also relates to a method of making such an outsole.

2. Description of Related Art

For some time now virtually all athletic shoes have been made with soles that are comprised of a shock absorbing midsole layer on the outside of which a wear resistant outsole with a tread surface is applied. The midsole is typically formed of a lightweight, soft foam material, such as a polyurethane foam, with or without weight-reducing and/or shock absorbence or distribution inserts, such as air bladders, honeycombs, gels, etc. On the other hand, the outsole has been formed of a hard, molded material, such as a thermoplastic elastomer such as PVC, synthetic rubber, etc. Because such outsole materials are relatively stiff and heavy, efforts have been made to reduce the area of the sole that is covered by the outsole, leaving gaps, e.g., in the arch area and portions of the heel which usually do not contact the ground. Likewise, the outsole has been provided with zones of increased flexibility, e.g., areas of thin wavy areas in the zone of the ball of the foot and other joint areas. However, all of these measures complicate the manufacturing process without optimizing the reduction of weight attributable to the outsole or minimizing the stiffening effect of the outsole.

In a departure from usual outsole construction practice, the DuoSole® outsole of the Asics Corporation uses a sheet of a synthetic suede fabric as a base layer to one side of which a uniform pattern of thermoplastic polyurethane tread elements is attached, apparently by cementing. Suitably shaped segments of the fabric are cut from the sheet (tread portions at the periphery of the segments also being cut) and then opposite side of the sheet from that having the tread elements is cemented directly onto desired portions of the midsole.

In this manner, outsoles which are significantly lighter and more flexible than those produced using conventional techniques can be obtained. On the other hand, while the specific technique by which the tread elements are attached to the fabric base layer is unknown, it is readily apparent from an examination of shoes with these soles that have been manufactured for the past three years, that the process makes it impractical to form or apply other than a uniformly distributed repeating pattern (analogous to repeating patterns on wallpaper) of relatively small tread elements that are all the same. This factor makes this technique unsuitable for requiring larger treads than are suitable for running shoes (e.g, cross trainers and shoes hiking shoes) and prevents optimizing of the tread pattern with different treads in different areas or applying of localized decorative, trademark or other designs to the tread surface. Still further, this manner of formation results in a substantial wasting of tread material since a significant number of tread elements will be located on areas of the based layer outside of the area(s) cut out. It has also been noted that in some instances a laminate base material construction has been used; but, such uses can result in the inner layer which is affixed to the sole separating from the outer layer to which the tread elements are affixed, which is clearly undesireable.

In an unrelated field, a geotextile having a uniformly distributed pattern nodules of a time-release soil treatment compound bonded to a flexible porous sheet material, such as a woven or nonwoven web of polypropylene filaments is known (U.S. Pat. No. 5,139,566). In particular, in one method of forming this geotextile, a mixture of an active agent and a binder is injected or forced under pressure through the porous web into an array of shaping cavities, over the open ends of which the web is held. The mixture is then allowed to solidify so that the web becomes entrapped within the nodules formed, the web having deformed/bulged into the open ends of the cavities. This process is dependent upon the porosity of the sheet material and the fluidity of the mixture being forced through it.

Thus, this process is not directly applicable to shoe outsole manufacturing where it is not desirable for the base material to be porous and where the tread material is highly viscous, even when molten. Furthermore, the disclosure is not oriented toward the various other considerations relevant to shoe sole manufacturing that are of no consequence in producing a soil treatment product.

SUMMARY OF THE INVENTION

It is a primary object of the present invention to improve upon outsoles for athletic shoes, particularly those for shoes, such as running shoes, in which the sole has a shock absorbing midsole layer on at least a selected area of the outer side of which a thin flexible sheet material, which has tread elements affixed to its outer side, is cemented at its inner side.

It is a specific object to achieve shoe outsole of the foregoing type which is suitable for shoes requiring larger treads than are suitable for running shoes (e.g, cross trainers and shoes hiking shoes) and which enables optimizing of the tread pattern with different treads in different areas or applying of localized decorative, trademark or other designs to the tread surface.

Another object of the present invention is achieve a process for producing an outsole in accordance with the preceding objects, and in addition, which will avoid a substantial wasting of tread material on used areas of the sheet material.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figures 1, 1A:
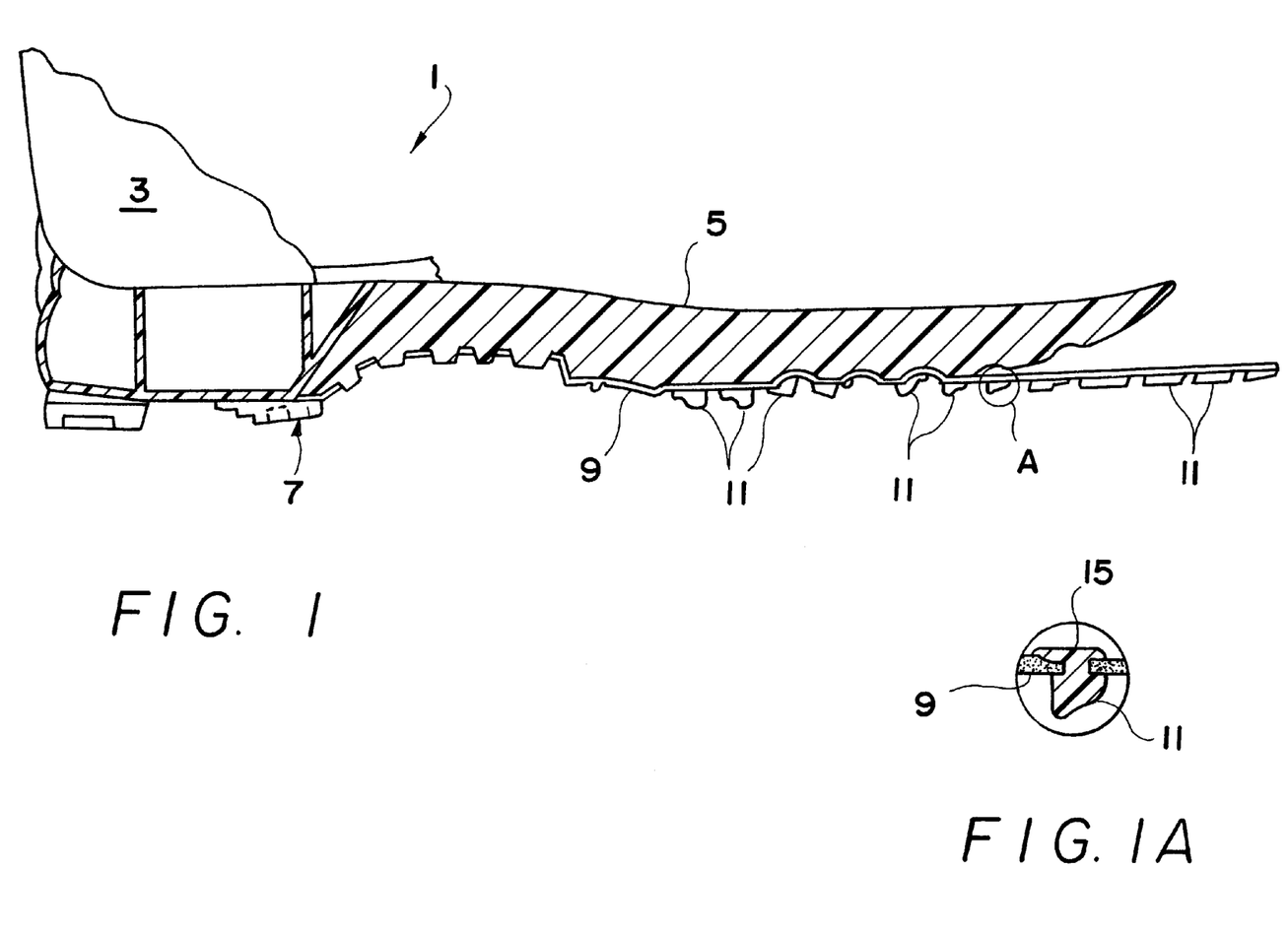
FIG. 1 is a side partial cross-sectional view of a portion of a running shoe in accordance with the present invention, taken along line 1—1 in FIG. 2, the outsole being shown detached from the midsole in a toe area.
FIG. 1A is an enlarged view of the encircled detail "A" of FIG. 1.

FIG. 1 shoes a portion of a shoe 1, in this case, a type of athletic shoe using for running which has an upper 3 attached to a shock absorbing midsole 5 and an outsole 7 having a tread bearing surface 7. The upper 3 and the midsole 5 can be formed of any conventional construction, and by themselves, their construction forms no part of the present invention.

Figure 2:
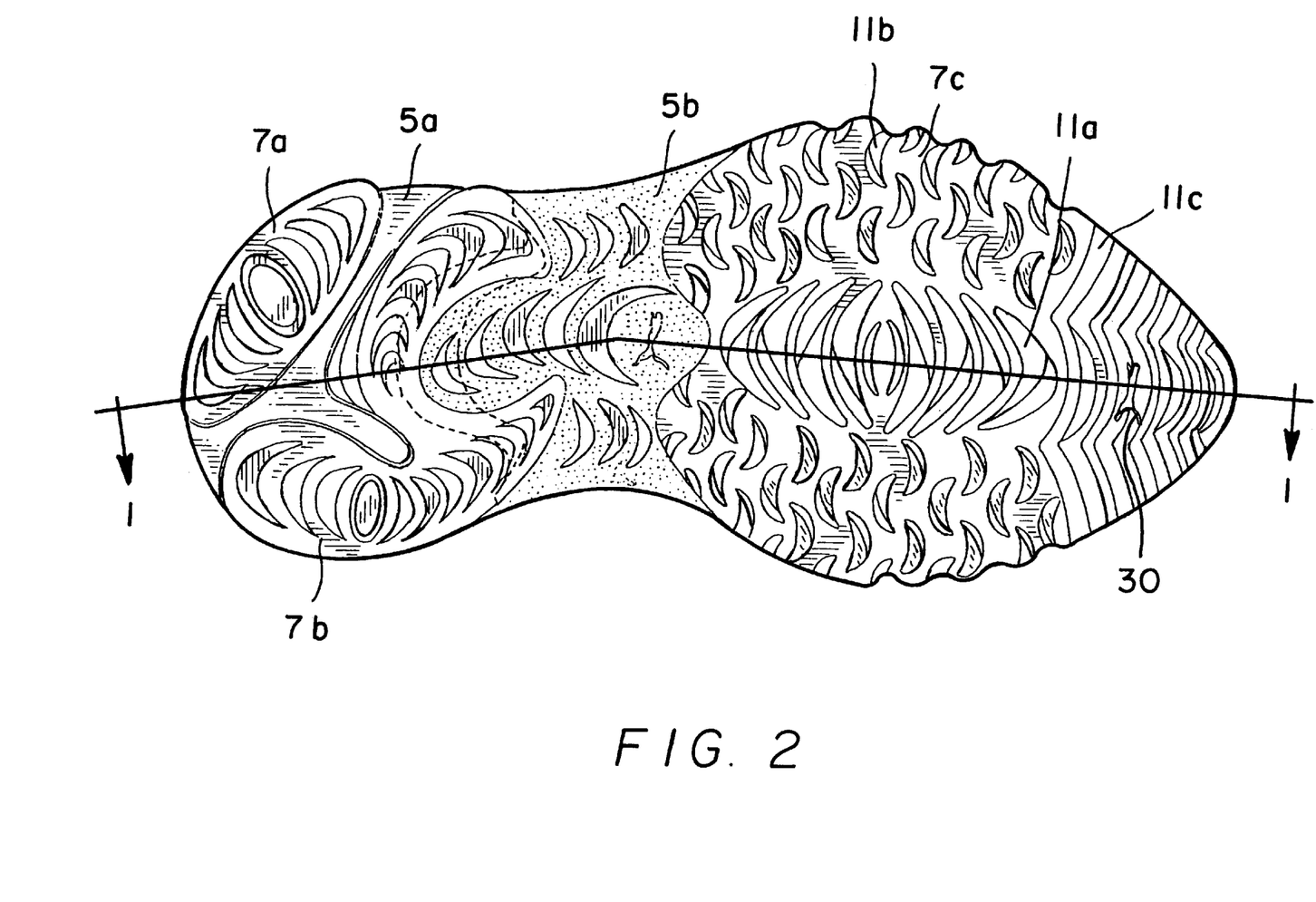
FIG. 2 is a bottom plan view of a the shoe according to FIG. 1.

With reference to FIG. 2, it can be seen that the outsole has been produced in multiple separate parts confined, in this case, to limited ground contacting portions 7a, 7b, & 7c with the material of the midsole being exposed in midsole portion 5a in the heel area and in midsole portion 5b in the area of the arch. Portions 7a & 7b in the heel area, in this case, have no projecting tread elements, and therefore, are formed in accordance with conventional outsole production techniques. However, for those shoes where projecting tread elements-are to be provided in the heel area, those portions of the outsole 7, or any others, can be produced in the manner to be described below relative to the outsole 7 in ground contacting portion 7c or the entire outsole can be produced in that manner.

In ground contacting portion 7c, the outsole is formed of a thin, flexible nonporous and inelastic sheet material 9 and a plurality of tread elements 11 of a hard, wear-resistant material that have been molded onto the outer side of said sheet material through perforations 13 formed in the sheet material 9, in a manner to be described, such that at least some of the tread elements 11 have anchoring portions 15 extending through the perforations from the opposite, upper side of sheet material 9. In this way, a portion of the sheet material 9 around the perforations 13 is held between the tread elements 1 land the anchoring portions 15, as is shown FIG. 1A. In this regard, it is noted that the size of the anchoring portion 15 in FIG. 1A has been exaggerated for illustration purposes and in actuality is relatively small in both area and thickness. Furthermore, as is illustrated in FIG. 1A, when the sheet material 9 is, for example, a micofiber fabric, it will be locally compressed in the area between the treads 9 and anchoring portions 15.

While a preferred sheet material 9 is a polyester microfiber fabric that has been impregnated with a urethane cement, a polyester film, a polyester mesh, a nylon screen, a polyurethane film, a synthetic suede, a synthetic leather and other similar materials can be used instead. Likewise, various materials can be used for the tread elements 11, such as a thermoplastic rubber, a thermoplastic polyurethane, a synthetic rubber or PVC.

The process of by which a outsole is produced in accordance with the present invention will now be described.

Figure 4:
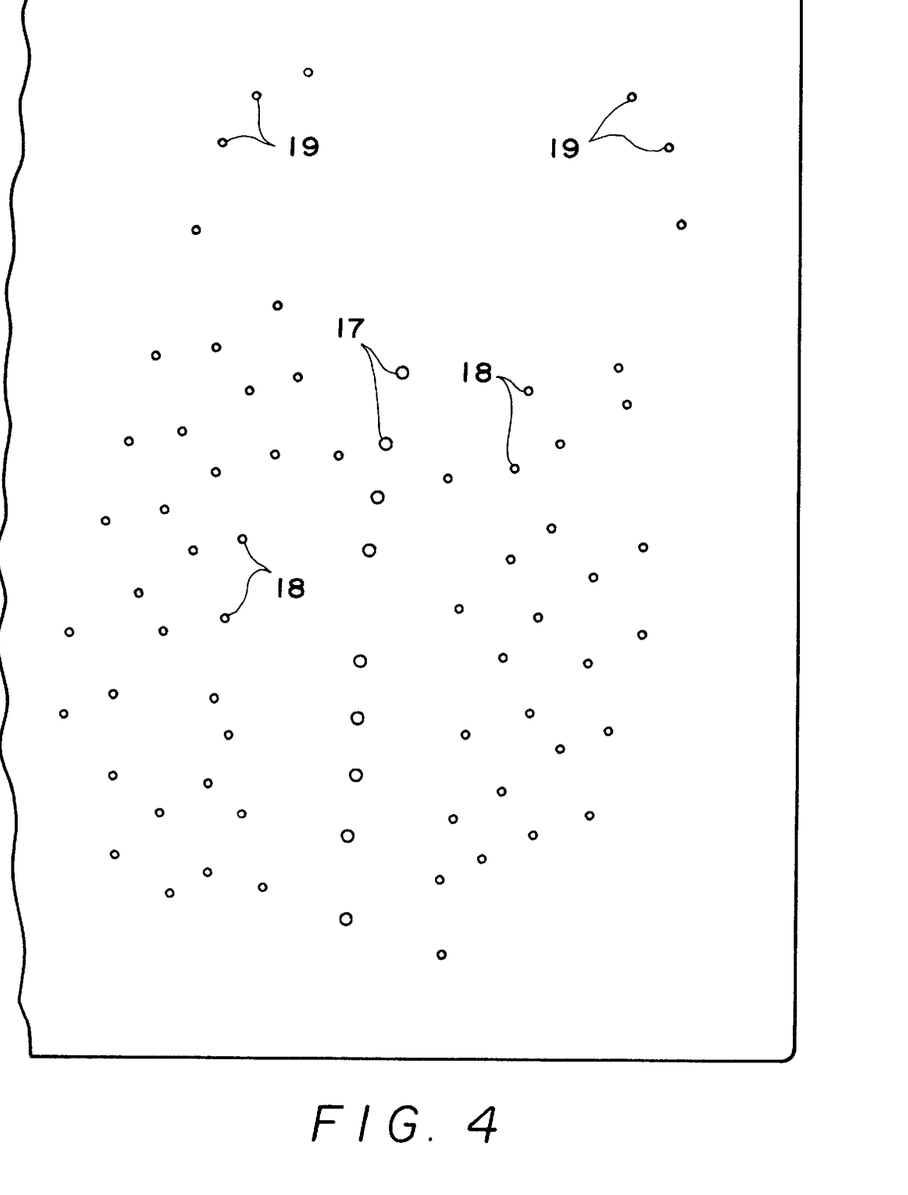
FIG. 4 is a plan view of a segment of a base material prepared for insertion into the machine of FIG. 3.

A thin, flexible inelastic sheet material is provided with a coating of a urethane cement on one side, and if the sheet material is porous in nature, such as the preferred polyester microfiber fabric, prior to application of this coating, it is first impregnated with such a cement so that it is no longer porous. The sheet material 9 is then perforated in a pattern corresponding to the size and location of the tread elements desired, FIG. 4 showing a pattern of perforations 17, 18, 19, as might be used to produce the outsole shown for ground contacting portion 7c in the forefoot area of shoe 1. In particular, relatively large tread elements 1 la provided in a central area rearward of the toe region (formed by the central row of perforations), relatively small tread elements are provided at lateral and medial sides of the central area (formed by the flanking arrangements of perforations 18) and tread elements are provided in the toe area which extend across the width of the sheet material (for which perforations 19 are provided at opposite sides of the area across which each such tread is formed).

Figure 3:
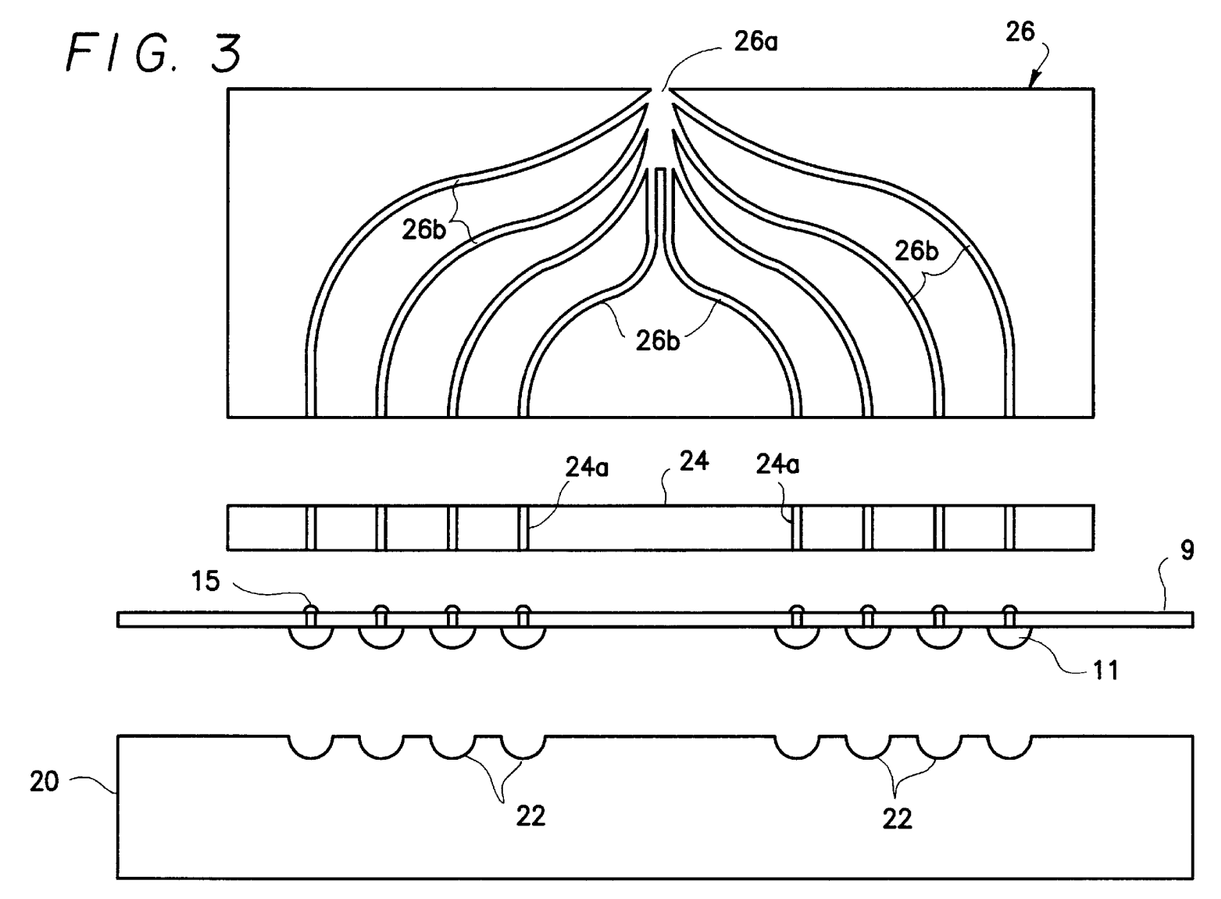
FIG. 3 shows a molding machine for use in performing the process of the present invention.
Figure 5:
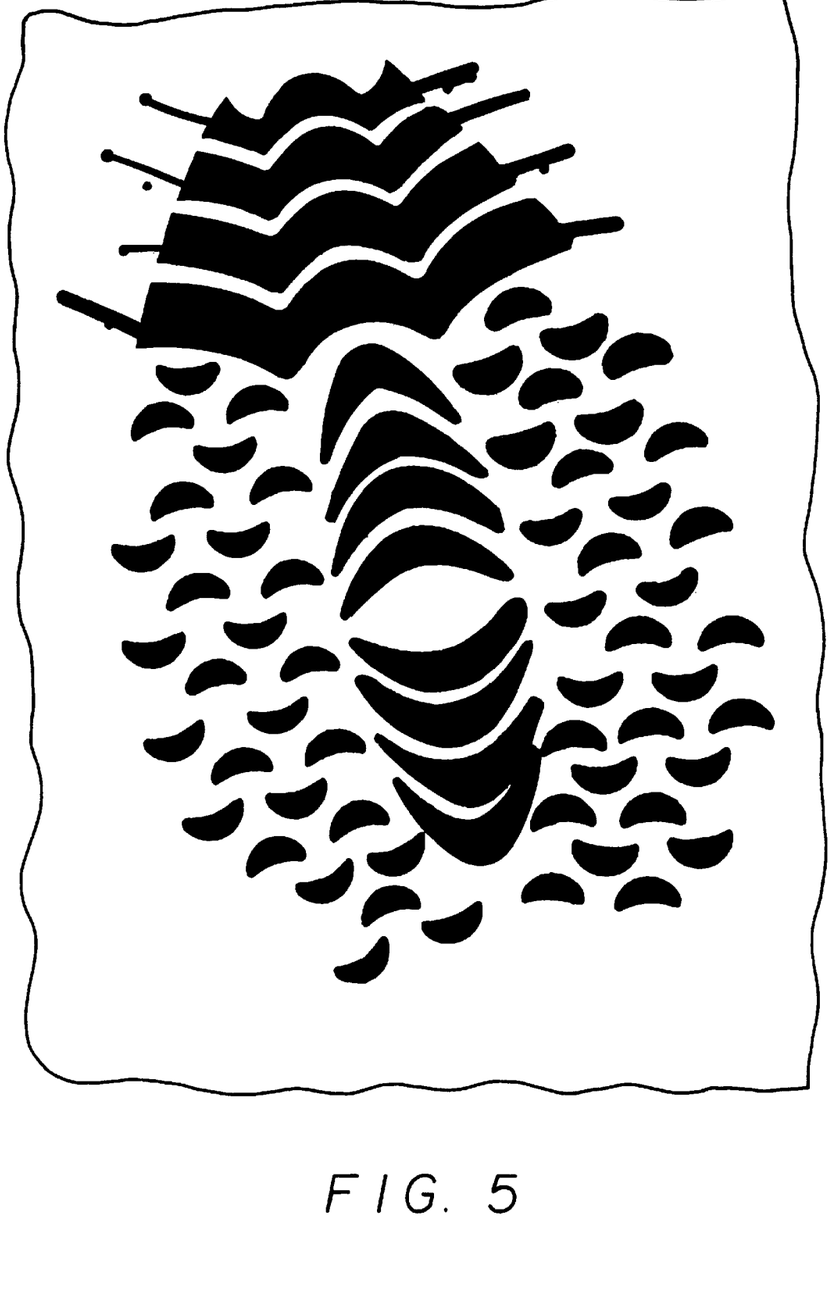
FIG. 5 shows the base material segment of FIG. 4 after removal from the FIG. 3 machine.

The perforated sheet material 9 is then secured over a mold 20 of a molding machine (not shown) with the side of the sheet material having the coating of urethane cement facing mold 20 and with perforations 17, 18 of the sheet material overlying the open ends of tread-forming cavities 22 of the mold 20, such as by an ejector plate 24, on top of which a plastic distribution platen 26 is applied. Then, a high pressure injector (not shown) is brought into engagement with the inlet 26a of platen 26, and tread material is injected through the runners 26b of the platen and the corresponding passages of the ejector plate 24 to and through the perforations into the cavities. In the case of the tread elements 11 c which are to extend across the entire sole, connecting sprue passages run from the opposite ends of the corresponding cavities to the associated perforations, as reflected by the sprue flash shown in FIG. 5. Under the heat of the molding operation, the coating of a urethane cement softens and upon cooling of the tread material, the resultant tread elements 11 become bonded to the sheet material 9 via the urethane cement. In the case of the very large tread elements 11c, due to their large surface area, the cement provides sufficient bonding strength, that cemented attachment of the smaller treads is reinforced by those tread elements 11a, 11b being provided with anchoring portions that extend from the tread elements 11a, 11b through the perforations 17, 18 to the opposite second of the sheet material 9 so that a portion of the sheet material around the perforations will be held between the tread elements and the anchoring portions as shown in FIGS. 1A & 3 and as mentioned above. Shifting of the mold 22, ejector plate 24 and platen 26 into the relative positions shown in FIG. 3 removes the sheet material with the tread elements thereon from the molding machine and severs the connection of the runner flash from the anchoring elements 15.

Figure 6:
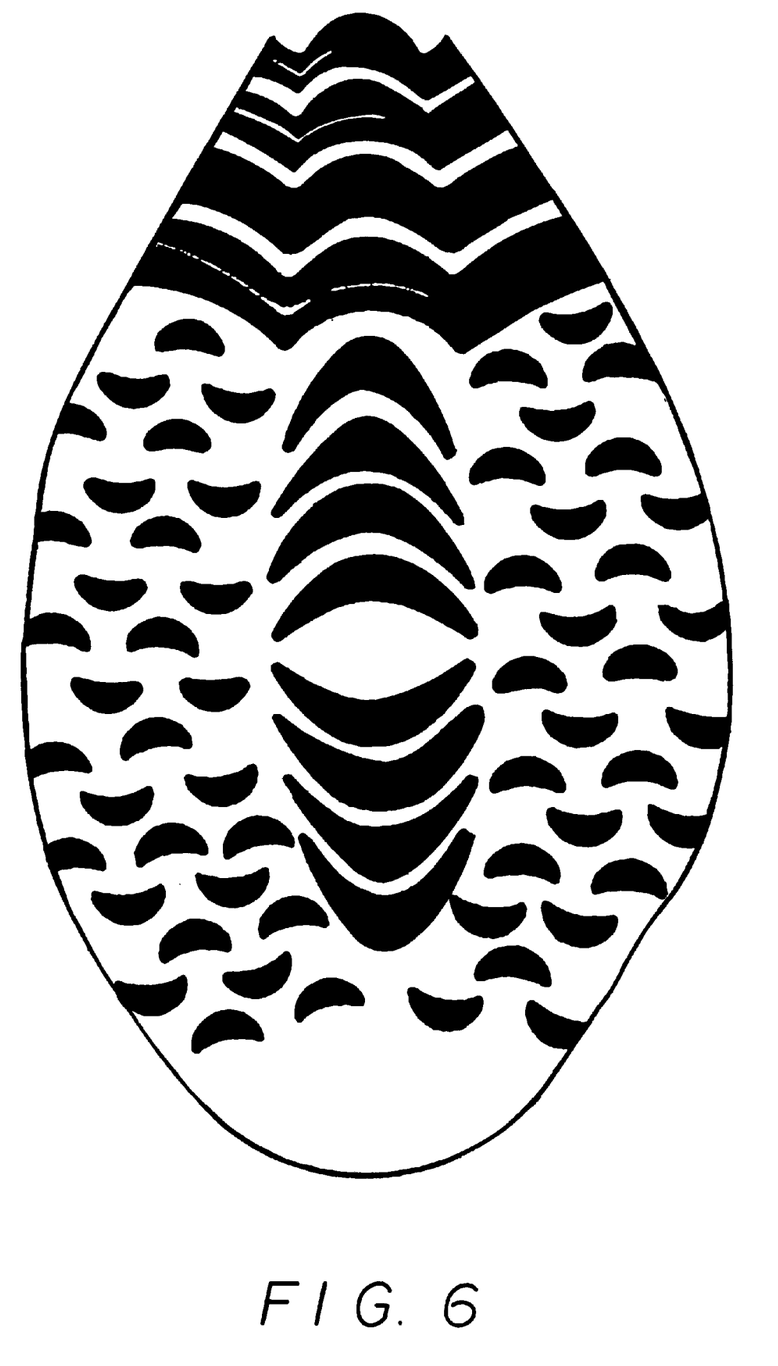
FIG. 6 shows the outer sole prepared from the FIG. 5 segment prior to attachment to the FIG. 1 shoe.

The sheet material 9 in its from as removed from the mold (FIG. 5) is cut into a perimetric shape matched to the perimetric shape of the sole surface to which the sheet is to be applied (FIG. 6). In this regard, a given tread pattern as shown in FIG. 6 can usually be used for about three consecutive shoes with only minimal wastage since, at most, only portions of the outermost of the tread elements 11b and the ends portions of the widthwise extending tread elements 11c will be cut off and become waste, the remainder of sheet material that becomes waste being free of tread material.

The specific tread pattern illustrated should not be viewed as anything more than merely illustrative of types of treads and tread combinations that can be used, the present invention being applicable to a wide variety of tread types, sizes and shapes. This technique, in addition to enabling treads of different sizes and shapes to be produced on a single outsole, also enables decorative patterns or trademarks to be created on the tread area as well, one such pattern being shown on at 30 in FIG. 2. Furthermore, while only the pattern for a single sole is shown as being formed, separate left and right patterns can be formed at the same time for one or more pairs of shoes.

The outsoles after being cut to size, have a urethane cement coating applied to the side of sheet 9 opposite the tread elements, the midsole 5 is applied against the cement bearing side of sheet 9 and in that condition they are heated, e.g., passed through a heating tunnel, to effect bonding of the outsole to the midsole. Thereafter, the shoe upper 3 is affixed to the midsole 5 in any conventional manner. However, it should be appreciated that the present invention is not limited to running shoes or even shoes with midsoles. Thus, the tread-bearing sheet forming the outsole of the present invention could be used on cross trainers and other types of athletic shoes, or may itself be a tread layer of an outsole of, e.g., a hiking shoe.

Thus, while various possibilities in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. An outsole for a shoe comprising a thin, flexible nonporous and inelastic sheet material having a pattern of perforations therethrough, and a plurality of tread elements of a hard, wear-resistant material molded onto a first side of said sheet material through said perforations in a manner such that at least some of the tread elements have anchoring portions extending through the perforations from an opposite second side of said sheet material, a portion of the sheet material around the perforations being held between the tread elements and the anchoring portions in an undeformed condition thereof.

2. An outsole according to claim 1, wherein the tread elements in at least one selected area of the sheet material are different from the tread elements in at least one other area of the sheet material.

3. An outsole according to claim 2, wherein the difference between the tread elements is at least a size difference.

4. An outsole according to claim 3, wherein the difference between the tread elements is also a difference in shape.

5. An outsole according to claim 2, wherein the difference between the tread elements is at least a difference in shape.

6. An outsole according to claim 2, wherein tread elements in a toe area of the sole extend across the width of the sheet material.

7. An outsole according to claim 6, wherein a forefoot region of the sole that is located rearward of the toe area contains relatively large tread elements in a central area thereof and relatively small tread elements at lateral and medial sides of said central area.

8. An outsole according to claim 2, wherein a forefoot region of the sole that is located rearward of a toe area contains relatively large tread elements in a central area thereof and relatively small tread elements at lateral and medial sides of said central area.

9. An outsole according to claim 1, wherein said sheet material is a polyester microfiber fabric impregnated with a urethane cement.

10. An outsole according to claim 9, wherein the polyester microfiber fabric also has a coating of urethane cement on said first side of the sole.

11. An outsole according to claim 10, wherein the tread elements are formed of a material selected from the group consisting of a thermoplastic rubber, a thermoplastic polyurethane, a synthetic rubber or PVC.

12. An outsole according to claim 1, wherein said sheet material is comprised of a material selected from the group consisting of a polyester film, a polyester mesh, a nylon screen, a polyurethane film, a synthetic suede, or a synthetic leather.

13. An outsole according to claim 12, wherein the tread elements are formed of a material selected from the group consisting of a thermoplastic rubber, a thermoplastic polyurethane, a synthetic rubber or PVC.

14. An outsole according to claim 12, wherein the sheet material is at least coated with a urethane cement on at least said first side of the sole.

15. A shoe comprising an upper and at least an outsole for a shoe, comprising a thin, flexible nonporous and inelastic sheet material having a pattern of perforations therethrough, said sheet material forming an outer surface of at least areas of an underside of the shoe, and a plurality of tread elements of a hard, wear-resistant material molded onto a first side of said sheet material through said perforations in a manner such that at least some of the tread elements have anchoring portions extending through the perforations from an opposite second side of said sheet material, a portion of the sheet material around the perforations being held between the tread elements and the anchoring portions in an undeformed condition thereof.

16. An outsole according to claim 15, wherein the tread elements in at least one selected area of the sheet material are different from the tread elements in at least one other area of the sheet material.

17. An outsole according to claim 16, wherein tread elements in a toe area of the sole extend across the width of the sheet material.

18. An outsole according to claim 17, wherein a forefoot region of the sole that is located rearward of the toe area contains relatively large tread elements in a central area thereof and relatively small tread elements at lateral and medial sides of said central area.

19. An outsole according to claim 16, wherein a forefoot region of the sole that is located rearward of a toe area contains relatively large tread elements in a central area thereof and relatively small tread elements at lateral and medial sides of said central area.

20. An outsole according to claim 15, wherein said sheet material is a polyester microfiber fabric impregnated with a urethane cement.

21. An outsole according to claim 20, wherein the polyester microfiber fabric also has a coating of urethane cement on said first side of the sole.

22. An outsole according to claim 15, wherein said sheet material is comprised of a material selected from the group consisting of a polyester film, a polyester mesh, a nylon screen, a polyurethane film, a synthetic suede, or a synthetic leather.

23. A process for producing a shoe sole comprising the steps of:

providing a thin, flexible nonporous and inelastic sheet material with a pattern of perforations therethrough;

securing the sheet material over a mold of a molding machine with the perforations of the sheet material overlying open ends of tread-forming cavities of the mold;

forming a plurality of tread elements of a hard, wear-resistant material by injecting the tread material through the perforations in the sheet material into the mold cavity and molding the tread elements onto a first side of said sheet material in a manner such that at least some of the tread elements have anchoring portions extending through the perforations from an opposite second side of said sheet material, a portion of the sheet material around the perforations being held between the tread elements and the anchoring portions;

removing the sheet material with the tread elements thereon from the molding machine; and cutting the sheet material into a perimetric shape matched to the perimetric shape of a sole surface to which the sheet is to be applied.

24. The process for producing a shoe sole according to claim 23, comprising, after said cutting step, the further steps of applying a urethane cement to the second side of sheet material , bonding the second side of sheet material against another sole layer.

25. The process according to claim 23, wherein the sole layer to which the sheet material is bonded is a midsole of shock absorbing material.

26. The process according to claim 23, wherein said sheet material is a polyester microfiber fabric impregnated with a urethane cement.

27. The process according to claim 26, comprising the further step of coating the impregnated polyester microfiber fabric with a layer of urethane cement on said first side of the sole prior to perforating of the sheet material.

28. The process according to claim 23, wherein said sheet material is comprised of a material selected from the group consisting of a polyester film, a polyester mesh, a nylon screen, a polyurethane film, a synthetic suede, or a synthetic leather.

29. The process according to claim 28, comprising the further step of at least coating the sheet material with a urethane cement on at least said first side of the sole prior to perforating of the sheet material.

30. The process according to claim 23, wherein tread elements are formed in a toe area of the sole which extend across the width of the sheet material.

31. The process according to claim 30, wherein relatively large tread elements are formed in a central area of a forefoot region of the sole located rearward of the toe area and relatively small tread elements are formed at lateral and medial sides of said central area.

32. The process according to claim 30, wherein the tread elements which extend across the width of the sheet material are formed by injecting of the tread-forming material into respective cavities at opposite sides thereof respective perforations in the sheet material communicating with the respective cavities via flow channels in the mold.

33. The process according to claim 23, wherein tread elements are formed in at least one selected area of the sheet material which are different from the tread elements formed in at least one other area of the sheet material.

34. The process according to claim 33, wherein relatively large tread elements are formed in a central area of a forefoot region of the sole located rearward of the toe area and relatively small tread elements are formed at lateral and medial sides of said central area.

35. The process according to claim 23, wherein the treads are formed in an overall arrangement that generally conforms with the area of the sole surface to which the outsole is to be applied, so that a minimum of tread material wastage occurs as a result of said cutting step.

* * * * *